US008678698B2

(12) United States Patent  
Kneif et al.

(10) Patent No.: US 8,678,698 B2  
(45) Date of Patent: Mar. 25, 2014

(54) HOLDING ELEMENT

(75) Inventors: Markus Kneif, Stadthagen (DE); Bertrand Touzet, Pollhagen (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/296,420

(22) Filed: Nov. 15, 2011

(65) Prior Publication Data

US 2012/0128411 A1  May 24, 2012

(30) Foreign Application Priority Data

Nov. 19, 2010  (DE) .......................... 10 2010 051 955

(51) Int. Cl.
*B25G 3/36* (2006.01)
*E04B 1/26* (2006.01)
*E04G 7/00* (2006.01)

(52) U.S. Cl.
USPC .......................................... 403/384; 403/345

(58) Field of Classification Search
USPC ......... 403/187, 252, 254, 299, 345, 353, 384; 248/420, 421, 429; 411/400, 401
See application file for complete search history.

(56) References Cited

U.S. PATENT DOCUMENTS

| 2,111,316 | A | * | 3/1938 | Brunk et al. ................... 439/514 |
| 3,281,102 | A | | 10/1966 | Hobson |
| 4,676,687 | A | * | 6/1987 | Koffler .......................... 403/386 |
| 4,982,542 | A | * | 1/1991 | Funaki ............................ 52/770 |
| 5,029,364 | A | * | 7/1991 | Salazar ........................... 16/382 |
| 5,142,832 | A | * | 9/1992 | Branham, Sr. et al. ......... 52/36.4 |
| 5,938,367 | A | * | 8/1999 | Olson ............................ 403/254 |
| 6,446,313 | B2 | * | 9/2002 | Pfister ............................. 24/514 |
| 7,401,995 | B2 | * | 7/2008 | Senakiewich, II ......... 403/374.4 |
| 7,992,693 | B2 | * | 8/2011 | Bottger et al. ............ 188/322.19 |
| 2008/0222993 | A1 | * | 9/2008 | Prichard et al. ................. 52/702 |

FOREIGN PATENT DOCUMENTS

DE        2307696    12/1973
DE   10 2009 020530   11/2010

* cited by examiner

*Primary Examiner* — Michael P Ferguson
*Assistant Examiner* — Nahid Amiri
(74) *Attorney, Agent, or Firm* — Bourque and Associates, PA

(57) ABSTRACT

A holding element, for supporting pivoting levers or the like, includes a support section for receiving an object to be supported as well as a first holding section and a second holding section. The first holding section includes at least a first holding projection and the second holding section at least a second holding projection. The first and the second holding sections are designed to rest against respective first and second contact sections of a component that is to be connected with the holding element. The holding projections are designed for being received in openings provided at the contact sections.

2 Claims, 3 Drawing Sheets

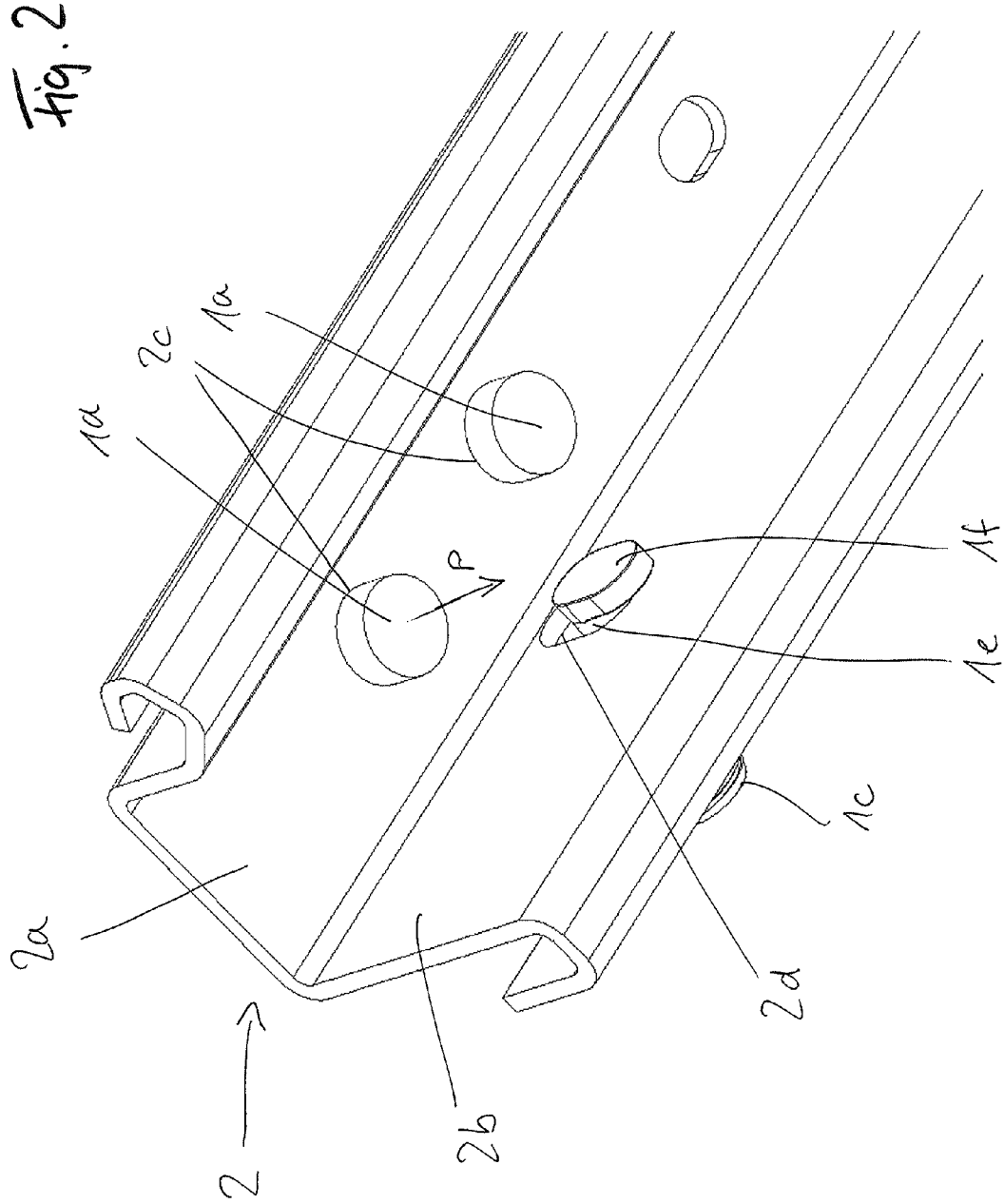

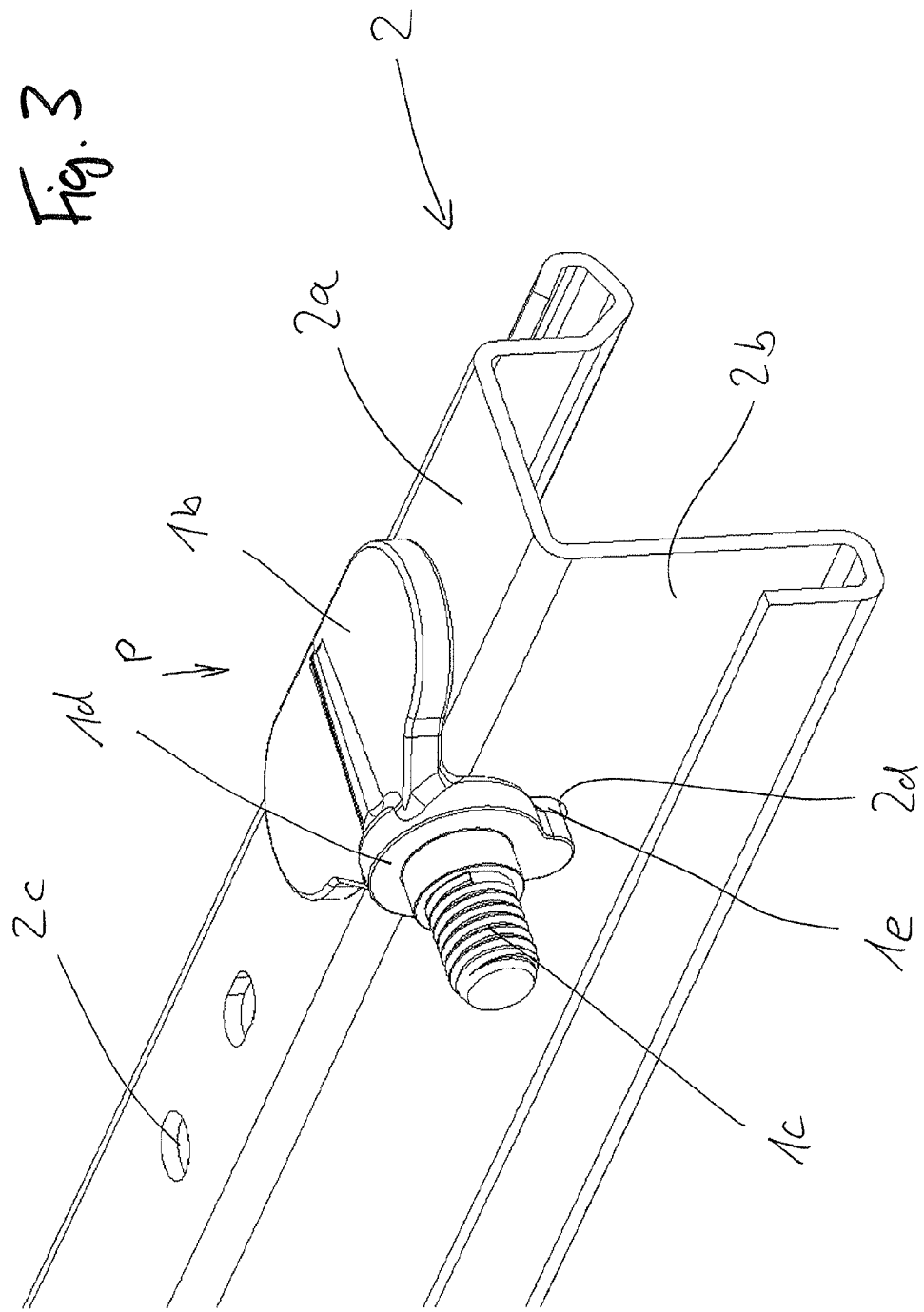

HOLDING ELEMENT

TECHNICAL FIELD

The invention relates to a holding element, in particular for the support of pivoting levers or the like, such as those that are used, for example, in the mounting of pivoting levers at car seat slide tracks.

BACKGROUND INFORMATION

With receiving elements such as slide tracks, the associated adjustment levers must be mounted on the tracks. In general, such tracks have a C- or U-profile, where special holders for receiving a bearing bolt for receiving a pivoting lever must be attached. Attaching such holders is sometimes complicated, especially since screw bolts for attaching the holders cannot as a rule be inserted from the inside through openings in the track or at least screw-fastening is not possible due to the limited space in the track. This in particular prevents that the bearing bolts for receiving pivoting levers and extending perpendicular to the driving direction cannot be inserted from the inside through openings in the track.

External holders must therefore be applied to the track to attach a bearing bolt thereon.

For example, it is known from DE 198 17 634 C1 that an external holder can be placed on top of the track and be secured there. For mounting, the holder features a respective keyhole-shaped cutout and holes for screws. At the rail a corresponding counterpart is provided which can then be inserted through the cutout. Securing is accomplished by moving the holder in the longitudinal direction of the track.

It is also known from DE 102 50 212 B4 that angled holders can be attached to the track. One leg of the angle is inserted through slots into the track and secured by a bolt from the bottom to the top side of the track.

SUMMARY

It is therefore an object of the invention to provide a holding element, with which a pivoting lever can be supported at a track, without the need for providing a separate holder, for example.

The holding element according to the invention includes a support section for receiving an object to be supported, such as for example a pivoting lever. Furthermore, a first holding section and a second holding section are provided. The first holding section includes at least one first holding projection and the second holding section includes at least one second holding projection, whereby the first and the second holding sections are designed for contact with respective first and second contact sections of a component, such as a track or the like, to be connected with the holding element, and the holding projections are designed for being received by openings provided at the contact sections. Thus, the support section can be attached at a track with a C-profile, without the need for screw fittings in the track. After insertion into the openings, the holding element can be welded to the respective component. Thus, a stable connection and support of a pivoting lever is possible, even if a relatively small installation space, for example in a C-profile of a track, is available.

It is particularly preferred if the holding sections are designed at an angle to each other, in particular perpendicular to each other. They can thus rest form-fittingly on components such as profiled tracks.

According to another advantageous embodiment, at least one of the holding projections includes a locking section for securing the holding projection in an opening. This facilitates the assembly. The locking section is advantageously formed as an undercut on the protrusion and can be inserted into a slotted opening of the respective counterpart during assembly. The undercut then ensures that the longitudinal section cannot be accidentally separated from the receiving section or fall out of the opening.

The support section preferably has a thread on which, for example, a pivot lever can be secured.

Preferably, several holding projections can be provided, in particular at least two first holding projections. During assembly, this ensures that the holding element cannot twist and after insertion into the openings of the receiving section is already in the intended target position for welding.

The invention also relates to a receiving device with at least one first contact section and at least one second contact section, wherein the above-described holding element may be received. Here, the first and the second contact sections each exhibit at least one opening, into which the first or the second holding projections of the holding element protrude and can be welded to the respective contact sections. The first and the second holding sections can contact the first and second contact sections of the receiving device to achieve a particularly good and tight fit.

It is preferably provided that the second holding projection includes a locking section which engages behind the edge of the opening provided at the second contact section. Preferably, it can also be provided that the opening in the second contact section is designed as an elongated hole, in which the second projection is moveable during insertion. In this manner, the holding element is pre-secured in the receiving device during assembly and cannot fall off.

BRIEF DESCRIPTION OF THE DRAWINGS

These and other features and advantages invention will be better understood by reading the following detailed description, taken together with the drawings wherein:

FIG. 2 is a perspective view of a receiving device according to the invention with an inserted holding element in a first view; and FIG. 3 is a perspective view of a receiving device according to the invention with an inserted holding element in a second view.

DETAILED DESCRIPTION OF THE PREFERRED EMBODIMENTS

Figure 1:
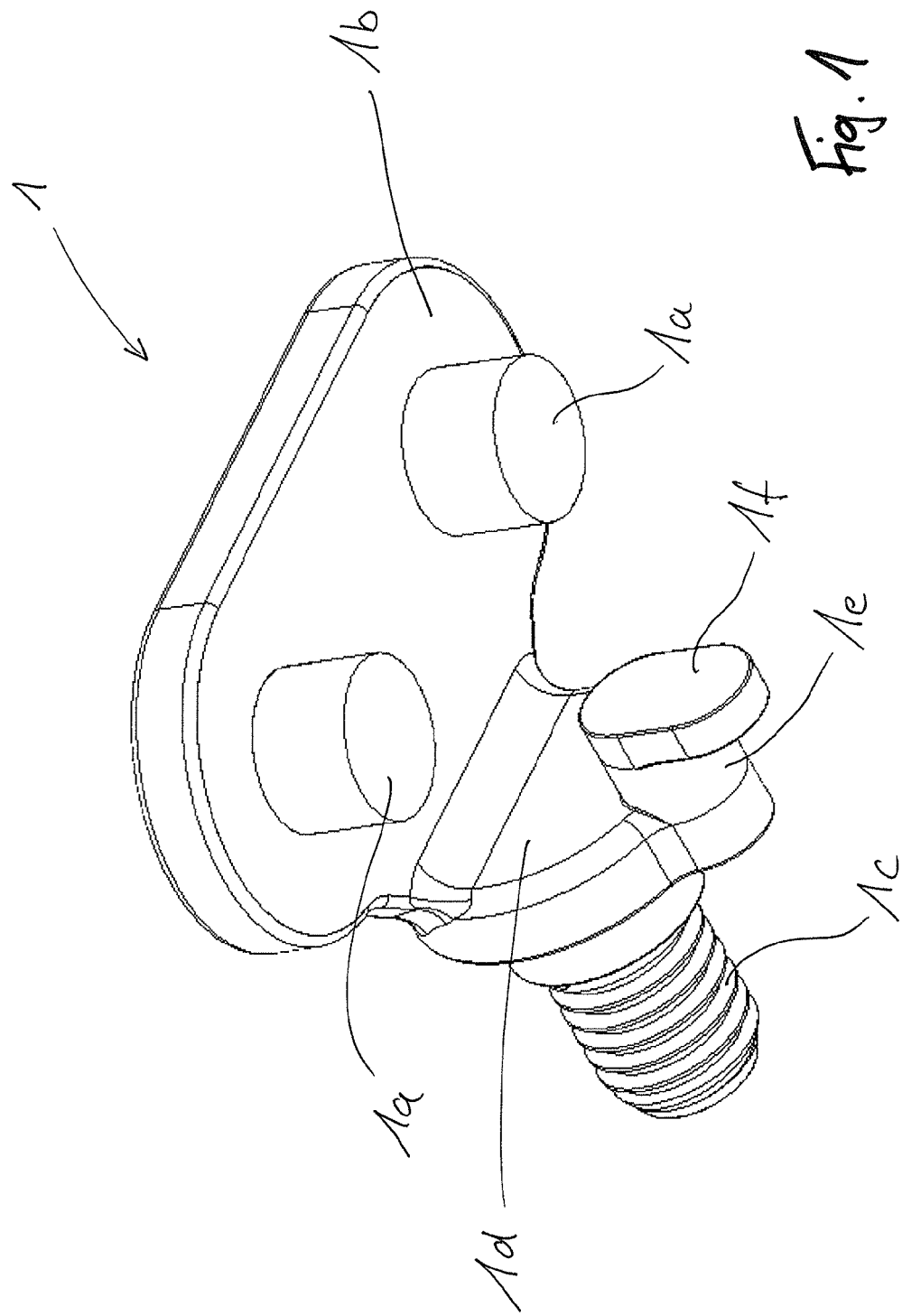
FIG. 1 is a perspective view of a holding element according to the invention.

The holding element 1 shown in FIG. 1 includes two holding sections 1d and 1b. Located at the outside of the holding section 1d is a support section 1c for supporting a component such as a lever, which includes a thread for securing the lever. Provided on the inside ("inside" here means that components designated with "inside" are located on a side, which during assembly are facing the receiving device shown in FIGS. 2 and 3) is a holding projection 1e with a locking section 1f provided at its free end, where said locking section engages behind a section of the receiving device. Provided on the inside of the other holding section 1b is at least one other (preferably at least two) holding projections 1a. In the shown example, the two holding sections 1d and 1b are arranged at an angle to each other, preferably at an angle of 90° perpendicular to each other.

The assembly is now illustrated based on FIGS. 2 and 3, which are referenced equally.

One can recognize the receiving device designated with the reference character 2, which in the illustrated example is a track for a vehicle seat adjustment. Such tracks are usually run in another additional track that is positively attached to the body, typically mounted to the floor of the motor vehicle. The receiving device, which is hereinafter for simplicity sake designated as track 2, includes a section with a C-shaped cross-section, which comprises in particular the contact sections 2a and 2b, the inner sides of which are shown in FIG. 2 and the outer sides in FIG. 3. The contact sections 2a, 2b preferably include hole-shaped openings 2c or 2d, which are designed such that the holding projections 1a and 1e of the holding element 1 can pass through.

The contact sections 2a, 2b in the example shown, are angled similar to the holding sections 1b, 1d against each other, preferably at a 90° angle, such that a plane or form-fitting contact of the inside of the holding sections 1b, if with the outer sides of the contact sections 2a, 2b is enabled. On the inside of the holding section 1b, the holding projections 1a fit into the holes 2c of the contact section 2a. Furthermore, the holding projection 1e together with its end 1f, which as a locking section or undercut is designed somewhat broader than the holding projection 1e, fits into the hole or the opening 2d in the contact section 2b, whereby the opening 2d in the example shown is designed as an elongated hole, which is dimensioned such that the locking section if can pass through it with sufficient play.

During assembly, the holding element 1 is placed against the track 2 such that initially the projections 1a run towards the openings 2c and are placed against them. Then, the holding element is rotated accordingly such that the projection 2a with the section if is guided through the opening 2d. After passing through the opening 2d, the holding element can be taken to the final position by pressure on the outside of the holding section 1b in the direction of the arrow P, which essentially corresponds to the extension direction of the projections 1a. In the case of a movement in the direction of the arrow P, the section if engages behind the edge region of the opening 2d of the contact section 2b at its inside, such that the holding element is now secured and cannot fall out. For final securing, the holding element 1 may be welded at the inside of the track 2 to said track, preferably in the area of projections 1a, 1e.

Modifications and substitutions by one of ordinary skill in the art are considered to be within the scope of the present invention, which is not to be limited except by the allowed claims and their legal equivalents.

The invention claimed is:

1. A holding system including a threaded holding element (1) connecting with a receiving device (2), for threadably connecting a threaded object with said receiving device (2), said holding system comprising:

a holding element (1), said holding element comprising:
  a threaded support section (1c), for threadably receiving said threaded object, wherein the support section (1c) of the holding element (1) includes a threaded region; and
  a first holding section (1b) and a second holding section (1d), wherein the holding sections (1b, 1d) are coupled to one another and arranged at an angle perpendicular relative to each other, whereby the first holding section (1b) includes at least one first holding projection (1a) and wherein the second holding section (1d) includes at least one second holding projection (1e), wherein said at least one second holding projection (1e) includes a cutout region forming a locking section (1f) in said second holding projection (1e), said locking section (1f) configured for securing the second holding projection (1e) in a corresponding second opening (2d) of said receiving device (2), whereby the first and the second holding sections (1b, 1d) are designed for resting against respective first and second contact surfaces (2a, 2b) of said receiving device (2) to which the holding element (1) is to be connected, and wherein the holding projections (1a, 1e) of said holding element (i) are designed to be received in corresponding openings (2c, 2d) provided at the respective first and second contact surfaces sections (2a, 2b) of the receiving device (2); and said receiving device (2) configured to be connected to the holding element (1), and wherein said receiving device (2) is an automobile seat slide track having a generally C-shaped cress-section, and wherein said receiving device (2) includes at least one first contact surface (2a) and at least one second contact surface (2b), whereby the first and the second contact surfaces (2a, 2b) are coupled to one another and arranged at an angle perpendicular relative to each other and each include at least one opening (2c, 2d) into which the first and second holding projections (1a, 1e) of said holding element (1) project, wherein in use, said first contact surface (2a) and said at least one opening (2c) in said first contact surface (2a) is disposed generally horizontally and said second contact surface (2b) and said at least one opening (2d) in said second contact surface (2b) of said receiving device (2) is disposed generally vertically, and wherein the opening (2d) in the second contact surface (2b) of the receiving device (2) is designed as an elongated hole into which the second holding projection (1e) and the locking section (1f) can move during insertion, and wherein when said second holding projection (1e) is inserted into and slid within said opening (2d) in the second contact surface (2b) such that said cutout region of said second holding projection (1e) abuts an edge region of said opening (2d) in the second contact surface (2b) of the receiving device (2) and said at least one first holding projection (1a) is received within the opening (2c) in the first contact surface (2a).

2. The holding system of claim 1, characterized in that at least two first holding projections (1a) are provided on said first holding section (1b) of said holding element (1).

* * * * *